United States Patent Office 2,994,021
Patented July 25, 1961

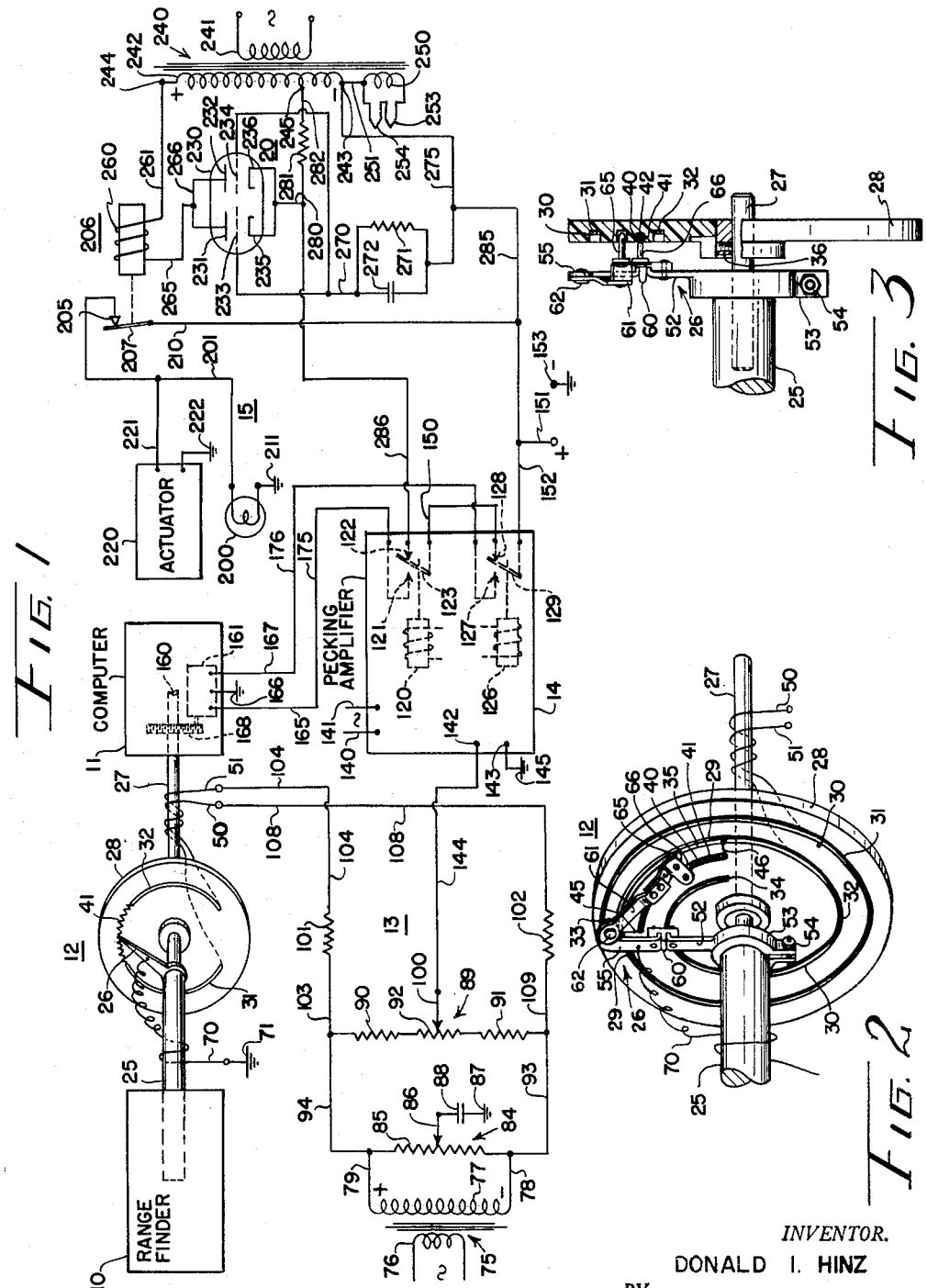

2,994,021
SERVOSYSTEM FOR COUPLING SHAFTS
Donald I. Hinz, St. Paul, Minn., assignor to Minneapolis-Honeywell Regulator Company, Minneapolis, Minn., a corporation of Delaware
Filed Jan. 19, 1953, Ser. No. 331,786
14 Claims. (Cl. 318—29)

This invention relates generally to improvements in the mechanical coupling and matching apparatus by which a range finder is connected to a computer in a gun sight adjusting mechanism used particularly with a large caliber gun in a tank.

Normally, in the coupling of the shaft of a device such as a range finder to another shaft, as the input shaft of a computer, in order to obtain an accurate coupling and still provide for movement of the first shaft at a rate greater than the second shaft can follow, a chaser switch mechanism or a mechanical latch mechanism is used. With a mechanical latch mechanism, the range finder shaft can be moved with respect to the computer shaft but, upon the relative positions of the two shafts approaching the desired coupling, a mechanical member drops into a detent so that a rigid coupling is obtained. In both the chaser switch and mechanical latch mechanisms, there is an inherent error in the coupling which, in the first type of device, is due to the movement necessary to actuate the switch mechanism and in the second type of device, the error is due to the tolerance allowances between the mechanical parts.

In the present invention a coupling is provided between a first shaft, such as an output shaft of a range finder and a second shaft such as the input shaft of a computer so that accurate matching of the positions of the two shafts can be obtained as well as having maximum flexibility in the movement of the first shaft with respect to the second shaft. It is therefore possible to adjust the range finder at a rapid rate and, upon the recovery of the computer, which is inherently slower, accurate coupling and precision matching of the positions of the two shafts will be obtained with the minimum amount of error and at the maximum possible rate of recovery of the computer mechanism. Thus upon adjusting the range finder, the sight adjusting mechanism, which is controlled by the computer, will be adjusted accurately and as rapidly. It is further provided that upon the accurate matching of the two shafts, an indicator is operated so that the gunner will know when the computer is properly adjusted by the range finder. This indicator mechanism can also help control the firing of the gun upon the complete adjustment of the mechanism.

It is therefore an object of my invention to provide a precision matching apparatus by which two shafts can be coupled to provide for flexible and accurate coupling so that one shaft can be moved with respect to the other and yet both may be brought into fast and accurate registry.

Another object of my invention is to provide a precision matching apparatus wherein two shafts can be coupled to provide for flexible and accurate coupling and, upon the recovery of any angular displacement of one shaft with respect to the other, an indicator will be actuated.

It is still another object of my invention to provide a precision matching apparatus in which two shafts can be coupled to provide for flexible and accurate coupling and upon the recovery of any angular displacement of one shaft with respect to the other, a timer mechanism will control the indication of such recovery.

It is a further object of my invention to provide a precision matching apparatus in which two shafts can be flexibly and accurately coupled by an electrical apparatus including a network circuit and a motor so that movement of the first shaft in either one or another direction beyond a predetermined angular segment of rotation from the coupled position provides for full speed operation of the motor in a direction to reposition the second shaft to the accurate coupled relation but wherein the motor speed is reduced as matching is approached to thereby prevent overshooting or hunting.

It is an additional object of my present invention to provide a precision matching apparatus in which two shafts can be flexibly and accurately coupled by an electrical apparatus which permits a movement of the first shaft in either one or another direction beyond a 360 angular rotation from the coupled position.

Other objects of the present invention will be apparent from a consideration of the accompanying specification, claims and drawing of which:

FIGURE 1 is a schematic view of the precision matching apparatus of the sight adjusting mechanism.
FIGURE 2 is a perspective view of the potentiometer shown in a schematic view in FIGURE 1.
FIGURE 3 is a side view of the potentiometer shown in FIGURES 1 and 2, with parts in section.

Referring to FIGURE 1, a range finder 10 and a computer 11 of a gun sight adjusting mechanism are shown in block diagram form and the two are connected by a coupling mechanism 12. In the drawing, while the coupling mechanism 12 is shown between the range finder and computer for clarity, it is actually contained inside the computer box 11 so that the range finder 10 is connected to the computer 11 by a solid mechanical connection. As shown in FIGURE 1, the coupling mechanism is shown in schematic form; however, the actual design is as shown in FIGURES 2 and 3. The coupling mechanism 12 comprises a balanceable electrical network circuit 13 which controls the operation of an amplifier 14. The amplifier drives the follow-up mechanism of the computer which will be explained in detail hereafter. An indicator means 15 is connected through a timer circuit 20 to the amplifier 14 to provide for an indication of precision matching of the coupling device 12.

An output shaft 25 of the range finder 10 is connected to a wiper arm assembly 26 of the coupling device 12. An input shaft 27 of the computer 11 is connected to a disk 28 of the coupling device 12 by a set screw 36. Referring to FIGURES 2 and 3 the disk 28 is shown to have a spiral groove 30 extending from the outside edge of the disk and winding on the front surface of the disk about the center through an angular travel of approximately 800°. A pair of conductor bars 31 and 32 are recessed in the groove 30 so as to extend from the points 29 adjacent the midsection of the groove 30 to the opposite ends of the groove 33 and 34, respectively. A portion 35 of the groove 30 extending approximately 15° on opposite sides of the midsection of the groove 30 and between the points 29 is empty so that the ends of the conductors 31 and 32 are separated by an angular segment of the disk 28 of approximately 30°. A second groove 40 extending parallel and adjacent one side of section 35 of the groove 30 contains a resistance winding 41 wound on a bobbin 42 so that the winding can be laid in the groove 40, winding 41 and groove 40 preferably being of greater angular extent than dead space 35. The opposite ends 45 and 46 of the resistance winding 41 are connected to the solid conductors 32 and 31, respectively, so that an electrical circuit exists between the conductors 31 and 32 through the resistance winding 41. A pair of lead-in conductors 50 and 51 are connected to the solid conductors 31 and 32, respectively, and may, for instance, be twisted about the shaft 27 so that upon rotation of disk 28 electrical contact can be maintained with the conductors 31 and 32.

The wiper arm assembly 26 comprises a lower portion 52 that is connected to the shaft 25 by a clamp 53 having a bolt and nut assembly 54. An upper portion 55 of the wiper arm assembly 26 is connected to the lower portion 52 by an insulator member 60. The lower portion 52 and upper portion 55 are riveted to the insulator member 60 so that a solid arm extends outward from the shaft 25 to a distance approximately equal to the radius of the disk 28. An extending portion 61 of the wiper arm assembly 26 is pivotally attached to the outer extremity of the upper portion 55 by a washer and rivet assembly 62. The end of the arm 61 opposite the pivotal connection to the upper portion 55 has a pair of projecting contact members 65 and 66 that project at right angles to the disk 28. These members are arranged so that contact member 65 moves in the portion 35 of the groove 35 at the same time that the member 66 slides on the resistor 41. Upon rotation of the wiper arm assembly 26 with respect to the disk 28 the contact member 65 will always follow the groove 30. When the contact member 65 is in the portion 35 of the groove 30, a circuit will be made between the resistor 41 and the contact member 66. Upon moving the wiper arm assembly 26 sufficiently in either direction by rotating the shaft 25 the contact member 66 will be forced off the resistance winding 41 by the contact member 65 riding upon either the solid conductor 31 or the solid conductor 32. As members 65 and 66 are electrically connected, the effective end of resistor 41 is reached when 65 contacts a solid conductor and, as above, contact with 41 is actually broken when 66 is lifted by a solid conductor lying in groove 30. A lead-in conductor 70 is connected to the upper portion 55 of the wiper arm assembly 26 and, for instance, is twisted about the shaft 25 so that electrical connection can be maintained with the wiper arm assembly regardless of the position of the assembly, conductor 70 being connected to ground at 71.

Again referring to FIGURE 1 the network circuit 13 is energized by a transformer 75 having a primary winding 76 connected to a suitable source of alternating current and having a secondary winding 77 with two end terminals 78 and 79. Connected across the terminals 78 and 79 is a network circuit comprising three parallel branches. The first branch comprises a capacity balance potentiometer 84 having a resistor 85 connected across terminals 78—79 and an adjustable tap 86 that is connected to a ground connection 87 through a capacitor 88. The second branch circuit comprises a pair of resistors 90 and 91 and a calibration potentiometer 89 comprising a resistor 92 connected between the resistors 90 and 91 to form a series circuit connected to the end terminals 78 and 79 by the conductors 93 and 94, respectively. A wiper 100 is manually adjustable along resistor 92 and forms an output terminal for the network. The third branch connected across terminals 78 and 79 comprises a resistor 101 and a resistor 102, with the coupling device 12 connected between the resistors 101 and 102 by conductors 50 and 51, and wires 103 and 104, the branch, in more detail, extending from terminal 79 through conductor 94, conductor 103, resistor 101, conductor 104, conductor 51, coupling device 12, conductor 50, conductor 108, resistor 102, conductor 109, conductor 93, and terminal 78.

The amplifier 14 is of a type similar to that disclosed in the W. H. Gille et al. Patent 2,425,733, issued August 19, 1947. The present amplifier differing by using relays with both "in" and "out" contacts instead of relays with only "in" contacts, as in the patent. In this case, relay 120 having contacts 121 and 122 and a switch arm 123 is equivalent to 158 in the patent and relay 126 having contacts 127 and 128 and a switch arm 129 is equivalent to the patent relay 162. The switch arms 123 and 129 normally engage out contacts 122 and 128, respectively and pull in to engage contacts 121 and 127. Amplifier 14 is generally known as a pecking amplifier in that the circuit is designed so that upon applying an input signal to the amplifier either the one or the other of the relays 120 and 126 will operate. As the condition being controlled approaches a balanced state and the input signal decreases the relay will become deenergized for a moment and then on the continuation of the input signal the relay will be energized again. The relay is thus alternately energized and deenergized so that the mechanism being controlled will receive pulses having a decreasing percentage of "on" time as balance is approached thereby preventing overshooting. Obviously, as the percentage of "on" time decreases, the percentage of "off" time, and the time between pulses increases with, of course, the "off" time being continuous at exact balance. The amplifier 14 is connected to a source of alternating voltage by the conductors 140 and 141. The input terminal 142 is connected to the adjustable wiper 100, one output terminal of network 13, on the calibration potentiometer 89 by a conductor 144 and the input terminal 143 of amplifier 14 is connected to a ground connection 145 so that a common circuit exists between the other output terminal 70 of the network circuit 13 and the amplifier through the common ground connections 71 and 145. The contact 128 of amplifier 14 is connected to the switch arm 123 by a conductor 150 and the switch arm 129 is connected to a source of positive direct current voltage at terminal 151 by a conductor 152, the negative side 153 of the D.-C. power source being grounded.

An end 160 of the shaft 27 opposite the coupling device 12 drives the internal mechanism of the computer, not shown. A reversible motor 161, of any conventional type suitable for the present use has input connections 165, 166, and 167, the common input connection 166 is being connected to ground. When a DC voltage is applied between the input conductor 165 and ground, the motor 167 will operate, through gear train 168, to rotate the shaft 27 in one direction and when the voltage is applied between the input conductor 167 and ground the motor will operate to rotate the shaft 27 in the opposite direction. Motor 161 not only positions disk 28 of mechanism 12 through shaft 27 but also furnishes the energy for operating the computer and sight adjusting mechanism that is coupled to the end 160 of the shaft 27. The input terminals 165 and 167 are connected to the contacts 121 and 127 of relays 120 and 126, respectively, by the conductors 175 and 176.

To aid in describing this apparatus, the polarity of the secondary winding 77 of transformer 75 is shown with the end terminal 79 positive and the end terminal 78 negative; however, it is obvious that since the voltage applied to the transformer is alternating this operation will only take place for one-half cycle of the alternating voltage. The amplifier 14 is so connected to the source of supply voltage that when the phase of the input signal to the input terminal 142 is of one sort, one of the relays will be energized, and when the input signal is of the opposite phase the other relay will operate. For the present description, assume that the amplifier is connected to the source of supply voltage in such manner that a positive voltage with respect to ground, applied to the input terminal 142 will cause the relay 120 of the amplifier 14 to operate. Thus, voltage will be applied to the input connection 165 to operate the motor 161 in a direction to rotate the shaft 27 in a counter-clockwise direction, looking toward the coupling device 12 so that, with the wiper arm assembly 26 remaining stationary, the operation of shaft 27 and disk 28 by the motor 161 will be in a direction to bring contact member 65 into engagement with the solid conductor 32.

As the coupling device 12 is shown with the wiper arm assembly in the center of the resistor 41 and the wiper 100 of the calibration potentiometer 89 is in the center of the resistance winding 92, the network 13 is assumed to be balanced and there is no voltage applied to the input terminal 142 of the amplifier 14. Should the coupling between the shaft 25 and the shaft 27 need re-matching, an adjustment of the wiper 100 on the resistance winding 92 would change the null point of the wiper arm assembly 26 with respect to the resistor 41. Movement of the wiper 100 in an upward direction toward the end of the resistor 92 with the polarities as shown in the drawing, will apply a positive voltage to the input terminal 142 of the amplifier 14. As previously stated, this positive voltage causes energization of the relay 120 thereby causing rotation of the disk 28 in a manner to adjust contact member 66 along resistor 41 to a resistor end 46. In a similar manner, movement of the wiper 100 downward on the calibration potentiometer 89 will produce a readjustment of the contact member 66 in the opposite direction on resistor 41.

The capacity balance potentiometer 84 provides for balancing of the capacitance in the wires of the installation and operates in a manner well known in the art.

Referring to the indication means 15, an indicator light 200 is connected by a conductor 201 to a contact 205 of a relay 206, this relay being controlled by a timer circuit 20. A switch arm 207 of the relay 206 is connected by a conductor 210 to the positive source of DC voltage 151 and controls the energization of indicator light 200, the energizing circuit being completed by conductor 211 to ground, the negative side of the D.C. source being grounded, as before mentioned. Also, an actuator 220 is connected in parallel to light 200 by conductor 221, connected to conductor 201 and to ground by conductor 222.

The timer circuit 20 comprises a dual-triode electron discharge device 230 having a pair of anodes 231 and 232, a pair of control electrodes 233 and 234, and a pair of cathodes 235 and 236. Transformer 240 includes a primary winding 241 connected to a source of alternating current similar to that to which the primary winding of the transformer 75 and the pecking amplifier 14 is connected. The transformer 240 has a first secondary winding 242 having end terminals 243 and 244 and an intermediate tap 245. A second secondary winding 250 has one end connected to end terminal 243 of winding 242 by a conductor 251. A pair of cathode heaters 253 and 254, for the associated cathodes 235 and 236 of the electron discharge device 230, are connected in series across the output terminals of the second secondary winding 250.

Winding 260 of the relay 206 has one end terminal connected by conductor 261 to transformer terminal 244 and the other terminal of relay winding 260 is connected by a conductor 265 to conductor 266 that connects the anodes 231 and 232. The control electrodes 233 and 234 are connected to terminal 151 by a circuit traced through conductor 270, a parallel circuit comprising resistor 271 and condenser 272, and conductor 285.

The cathodes 235 and 236 are connected by conductor 280, resister 281, and conductor 282 to tap 245 of the transformer 240. The conductor 275 connects end terminal 243 to terminal 151. The conductor 280 is connected by conductor 286 to contact 122 of amplifier 14 so that upon deenergization of both of the relays 120 and 126 terminal 151 will be connected by an alternate circuit to the electron discharge device 230 through conductor 152, switch arm 129, contact 128, conductor 150, switch arm 123, contact 122, conductor 286, and conductor 280 to device 230.

Assume now that one of the relays 120 or 126 is energized so that the previously described circuit to the electron discharge device 230 is open and that the polarity of the voltage output of the secondary winding 242 is as shown. Again, it should be understood that this voltage is only at the polarity shown for 1/120 of a second or one-half cycle, but the operation is more readily explained in terms of polarity, as indicated, with the end terminal 244 positive and terminal 243 negative. The value of the resistor 281 in the cathode circuit is such that, upon the plates 231 and 232 being positive with respect to the cathodes, a current flowing through the parallel triode sections of the electron discharge device 230 will produce a voltage drop across the resistor 281 sufficient to bias the electron discharge device to cut off. The resistor 281 is commonly known to those skilled in the art as a cathode bias resistor. Since the current that is necessary to produce cut off of the electron discharge device by the bias of the resistor 281 is low, the relay assembly 206 will not be energized and therefore the switch arm 207 will not engage contact 205. On the next half-cycle of the alternating voltage, when the polarity of the secondary winding 242 reverses so that the polarity is opposite that as shown, the electron discharge device will not conduct since the plates are then negative with respect to the cathodes. At this same time, the control electrodes 233 and 234 are biased positive with respect to the cathodes 235 and 236 by the voltage obtained from the portion of the secondary winding 242 between the tap 245 and the end terminal 243. During this half cycle of positive bias on the control electrodes, a current will flow from the control electrodes to the cathodes and this current will charge the condenser 272. The polarity of the condenser is such that the plate closest to the control electrode will be negative with respect to the plate connected to the conductor 275. In a very few cycles of operation the condenser 272 will become completely charged and will tend to maintain this charged condition as long as the circuit operates as has been explained. All of this time, the positive D.C. voltage source 151 has been connected to the conductor 275 through conductor 285 but, since no point of the timer circuit 20 is grounded, the voltage source 151 has no effect on the circuit.

If now, any unbalance condition that had been imposed on the pecking amplifier 14 is satisfied, then both of the relays 120 and 126 are deenergized and terminal 151 is connected to the cathodes 235 and 236 through the alternate circuit. This provides a shunting circuit for the electron discharge device current to by-pass the cathode bias resistor 281, traced from the cathodes 235—236, through conductor 280, conductor 286, the amplifier 14, conductor 152, conductor 285, conductor 275, terminal 243, secondary winding 242, conductor 261, relay winding 260, conductor 265, and plates 231 and 232. Without the voltage drop across cathode bias resistor 281 to bias the tube below cut-off during the half-cycle of voltage at which time the plates of the electron discharge device are positive with respect to the cathodes, the discharge device would conduct if it were not for the charge on the condenser 272 which was previously built up. However, this charge leaks off through resistor 271 and, upon a sufficient discharge of the condenser 272 through the resistor 271, a negative bias voltage will be applied to the control electrodes 233—234 of the electron discharge device. The discharging of condenser 272 requires time and prevents the winding 260 of the relay assembly 206 from being energized until a predetermined time has elapsed. Should the relays 120 or 126 of the amplifier be energized again before the time period has expired, that is before condenser 272 is sufficiently discharged, the shunting circuit around the resistor 281 will be removed and immediately the condenser 272 will again be charged. The timer circuit thus provides for a delay in the operation of the relay assembly 206 and, upon the reenergization of the pecking amplifier relays, the timer will again be energized so that it is necessary for both the relays 120 and 126 to remain deenergized for a period greater than the predetermined time period of the timer before relay assembly 206 can be energized. The predetermined time delay of the circuit 20 can be adjusted by changing the value of the condenser 272 or the value of resistor 271.

Operation

The apparatus shown in FIGURE 1 is in a balanced condition, with shaft 25 of the range finder 10 accurately coupled and matched to the shaft 27 of the computer 11. Therefore, the wiper arm assembly 26 of the coupling device 12 is positioned on the resistance winding 41 so that the balanceable electrical network circuit 13 is balanced and no signal is being received by the input terminal 142 of the pecking amplifier 14. With no input signal to the pecking amplifier the relays 120 and 126 are deenergized and the motor 161 is also deenergized. Bias resistor 281 is shunted by the alternate circuit and electron discharge device 230 is conducting to thereby energize the relay 206. The switch arm 207 is held against the contact 205 so that the actuator 220 and the indicator light 200 are energized. So far as this mechanism is concerned, the gun may now be fired, assuming that actuator 220 does not have full control or would be fired if 220 does have entire control of the firing.

If the operator in the tank, or wherever such a gun and control mechanism are located, should now adjust the range finder for a new range and output shaft 25 is rotated counterclockwise, looking toward the coupling device 12, so that the wiper arm assembly is moved on the resistance winding 41 in the direction toward the solid conductor 31. The amount of unbalance of the electrical network circuit 13 will depend upon the extent of movement of the wiper arm assembly 26 and, if the contact member 66, as shown in FIGURE 3 does not move off of the resistance winding 41, the unbalance of the electrical network circuit 13 will be relatively small and the signal, as a result of the unbalance, fed into the input terminal 142 of the pecking amplifier 14 will also be small. Such a small positive signal will result in the energization of the relay 120 in short intervals so that voltage from the source 151 will be applied to the input terminal 165 of the motor 161 in short pulses to move the disk 28 and mechanism of the computer attached to the end 160 of the shaft 27 in a direction to bring the coupling device 12 back to rematch the shafts 25 and 27. Upon the energization of the relay 120 relay 206 is deenergized in a manner previously described. The relay 120 will be deenergized for short periods by the operation of the pecking amplifier 14 as a result of the small input signal; however, the timer circuit 20 keeps the relay 206 deenergized. Each time the relay 120 is deenergized, the condenser 272 starts to discharge through the resistor 271 but, so long as relay 120 is energized again before the condenser 272 has discharged a sufficient amount to raise the voltage on the control electrodes 233 and 234 to a value to provide for conduction of the electron discharge device 230, the relay 206 cannot be energized. As the actuator 220 can control, or may be in series with another control of the firing mechanism of the gun, it is seen that the firing of the gun cannot take place until the electrical network circuit 13 is balanced and thus the matching of the shafts 25 and 27 is complete and accurate.

If the operator should again adjust the range finder 10 and the change in range is such that the shaft 25 is rotated 360° counter-clockwise, looking toward the coupling device 12, relative to shaft 27. Referring to FIGURES 2 and 3 of the drawings it is seen that upon rotation of the shaft 25 and the wiper arm assembly 26, the contact member 65 will follow the groove 30 to contact the conductor 31. Further, as 65 rides upon conductor 31, 66 in lifted above any remaining portion of 41 and the disk 28. Such a condition causes maximum unbalance of the network circuit 13 and provides a maximum positive signal, using the polarity as indicated on the drawing. With the maximum positive input signal to the input terminal 142 the relay 120 is energized and remains energized to thus place a voltage on the input terminal 165 of the motor 161 to drive shaft 27 at the maximum rate possible in a counter-clockwise direction to follow the motion of 26 so that the contact member 65 will move on the solid conductor in a direction toward the resistance winding 41. As mentioned before, the energization of the relay 120 causes the relay 206 to be deenergized and the actuator and indicator light of the indication network 15 are likewise deenergized.

As the disk 28 rotates and the contact member 66 engages the resistance winding 41, the input signal to the pecking amplifier 14 then decreases and, due to the nature of the pecking amplifier, the relay 120 is then intermittently deenergized to slow down the operation of the motor 161. As the null position of the electrical network circuit 13 is reached by the contact member 66 on the resistance winding 41, the relay 120 then becomes deenergized and the motor 161 stops. When the relay 120 remains deenergized for a period long enough for the condenser 272 to discharge the relay assembly then becomes energized and the indicator light 200 shows the operator that a balanced condition has been reached. The sight mechanism attached to the end 160 of the shaft 27 in the computor 11 is then adjusted and the gun may be fired.

While the operation has been explained with the wiper arm assembly moving in such a direction that the contact member 65 engages the solid conductor 31, it should be realized that upon the change of the position in the range finder so that the shaft 25 rotated in the opposite direction a similar operation would take place except that, with the polarity as indicated, a negative signal would be fed into the input terminal 142 of the amplifier 14 to cause energization of the relay 126 which would drive the motor 161 in the opposite direction.

This description of my invention is for illustration only and the scope of the invention is to be limited only by the appended claims.

I claim as my invention:

1. In a precision matching apparatus, a driving means having a rotatable output shaft, driven means having a rotatable input shaft, motor means for driving said input shaft, a potentiometer including a wiper and a resistor mounted on the face of a disk, mechanical means operably connecting said wiper to said output shaft, second mechanical means operably connecting said disk to said input shaft, a common terminal, electrical means connecting said wiper to said common terminal, a balanceable electrical network circuit having an output terminal, second electrical means connecting said resistor as a component of said balanceable network circuit, pecking relay means having a pair of input terminals, third electrical connection means connecting said output terminal and said common terminal to said pair of input terminals, fourth electrical connection means connecting said motor means to said relay means so that operation of said relay means will reversibly control said motor means to position said input shaft, electronic timer circuit, fifth electrical connection means connecting said timer circuit in controlled relation to said relay means, a device to be energized upon the predetermined precise coupling of said output and input shafts, and sixth electrical connection means connecting said device to said timer circuit.

2. In a precision matching apparatus, coupling means comprising a potentiometer having a resistor mounted on a disk, said disk having a spiral groove from the outer edge thereof and extending inward about the center of said disk by an angular amount greater than 720 degrees, first and second conductors, said conductors being positioned in said groove to extend in opposite directions from an insulated portion at the mid-point of said groove, said insulated portion being adjacent said resistor, electrical means connecting said resistor to said first and second conductors, a pivoted wiper, said wiper being movable along said resistor for a portion of its angular motion with respect to said disk and movable along one or the other of said conductors upon a greater angular motion in either direction, driving means, means connecting said driving means to said wiper, driven means including a motor, means connecting said disc to said driven means, relay means, electrical network circuit means, connection means including said network circuit means for connecting said potentiometer to said relay means, further connection means for connecting said relay in controlling relation to said motor, indicating means, time delay mechanism, and connection means including said time delay mechanism for connecting said indicating means to said relay means to provide for an indication of a predetermined precise matching of said driving and said driven devices.

3. In a precision matching apparatus, driving means, driven means, coupling means comprising a potentiometer, said potentiometer having a resistor mounted on a face of a disk, said disk having a spiral groove on said face and extending an angular amount greater than 720 degrees, a pair of conductors, said conductors being positioned in said groove with their adjacent ends spaced by an amount approximating the length of said resistor and extending in opposite directions from said spaced ends, said spaced ends being located at about the midpoint of the groove, electrical connection means connecting said resistor between the adjacent ends of said conductors, said conductor ends extending to its respective end of the groove, a wiper, connection means connecting said driving means in controlling relation to said wiper, a balanceable electrical network circuit, relay means, connecting means including said network circuit and said relay means for connecting said potentiometer in controlling relation to said driven means, indicating means, time delay mechanism, and connection means including said time delay mechanism for indicating when said driving means and said driven means are in registry for a predetermined period.

4. In a precision matching apparatus, coupling means comprising a potentiometer having a resistor mounted on a disk, said disk having a spiral groove from the outer edge thereof and extending inward about the center of said disk by an angular amount greater than 720 degrees, first and second conductors, said conductors being positioned in said groove to extend in opposite directions from an insulated portion at the midpoint of said groove, said insulated portion being adjacent said resistor, electrical means connecting said resistor to said first and second conductors, a pivoted wiper, said wiper being movable along said resistor for a portion of its angular motion with respect to said disk and movable along one or the other of said conductors upon a greater angular motion in either direction, driving means, means connecting said driving means to said wiper, driven means including a motor, means connecting said disk to said driven means, relay means, electrical network circuit means, connection means including said network circuit means for connecting said potentiometer to said relay means, said network circuit being balanced at a predetermined position of said wiper on said resistor so that said network circuit is only balanced at one matched relationship of said driving means and said driven means and further connection means for connecting said relay in controlling relation to said motor.

5. In a precision matching apparatus, driving means, driven means, coupling means comprising a potentiometer, said potentiometer having a resistor mounted on a disk, said disk having a spiral groove on a face thereof and extending inward an angular amount greater than 720 degrees, a pair of conductors, said conductors being positioned in said groove and extending in opposite directions from a space in said groove at about the midpoint thereof, the adjacent end of said conductors bounding said space, connection means connecting said resistor to the adjacent ends of said conductors, a wiper, said wiper engaging said resistor and being adapted to move therealong, means connecting said driving means in position controlling relation to said wiper, a balanceable electrical network circuit, relay means, connecting means connecting said potentiometer as a part of said network circuit so that said network circuit is balanced when said wiper is at a predetermined position on said resistor, means connecting an output of said network circuit existing whenever said wiper deviates from said predetermined position to said relay means, and means connecting said relay means to said driven means for reversibly controlling said driven means in a direction depending upon which direction said wiper deviates from said predetermined position.

6. In a precision matching apparatus for coupling a first device to a second device, a potentiometer having a wiper and a resistor, said wiper being operatively connected to said first device and said resistor being operatively connected to said second device, a balanceable electrical network circuit including said potentiometer, said circuit being balanced when said wiper is at a predetermined position on said resistor, motor means, connection means connecting said motor means in driving relation to said second device, relay means, electrical connection means connecting said network circuit to said relay means, second connection means connecting said relay in a controlling relation to said motor thereby said motor being operated in one direction or the other depending upon which side of said predetermined position said wiper engages said resistor, and means associated with said relay for indicating a predetermined degree of registry of said first and second devices.

7. In a precision matching apparatus, a driving means, driven means, said driven means including motor means in driving relation thereto, a balanceable network including a potentiometer having a resistor and a wiper, said circuit being balanced when said wiper and said resistor have a predetermined relation, first mechanical means connecting said driving means in controlling relation to said wiper, second mechanical means connecting said driven means in controlling relation to said resistor so that the position of said wiper with respect to said resistor is indicative of the relation of said driving means to said driven means, relay means, connection means including said relay means for connecting said balanceable network circuit to said motor means, indicating means, and connection means including said relay means for connecting said indicating means to said balanceable network circuit so that an indication of circuit balance and thus a definite relation between said driving means and said driven means is indicated.

8. In control apparatus, a driving device, a driven device, a potentiometer having a wiper and a resistor, means connecting said driving means in controlling relation to said wiper, motor means, said motor means cooperating with said driven device, electrical network circuit means, and connection means including said network circuit means for connecting said potentiometer in energizing relation to said motor means, said circuit means being balanced when said wiper engages said resistor at a predetermined position between its extremities thereby said motor is de-energized, said potentiometer comprising a disk, said disk having a spiral groove on a face thereof and extending about the center of said disk by an angular amount greater than 720 degrees, a pair conductors, said conductors being positioned in said groove with their adjacent ends spaced apart and extending in opposite directions from the space between said adjacent ends, the space being approximately at the midpoint of said groove, said resistor being arranged on said disk and effectively extending from one of said adjacent conductor ends to the other of said ends, and electrical means connecting said resistor to said pair of conductors, said wiper being adjustable over said resistor and said conductors, said wiper being at said predetermined position on said resistor when said driving and driven devices are at a predetermined state of registry.

9. An electrical control circuit for use in a precision matching apparatus comprising, in combination, a source of voltage having two output terminals and a tap therebetween, an electron discharge device having an anode, a cathode, and a control electrode, a device to be energized, electrical connection means connecting said anode to a first of said output terminals said source of voltage through said device, a delay circuit comprising a resistor and capacitor connected in parallel, further electrical connection means connecting said control electrode to a second of said output terminals said source of voltage through said delay circuit, a bias resistor, third electrical means connecting said tap to said cathode through said bias resistor, and electrical circuit means shunting said bias resistor by interconnecting said second terminal and said cathode thereby rendering the discharge device conductive after a predetermined time and energizing said device.

10. In a precision matching apparatus, coupling means comprising a potentiometer having a resistor mounted on a disk, said disk having a spiral groove on the face thereof and extending about the center of said disk an angular amount greater than 720 degrees, first and second conductors, said conductors being positioned in said groove to extend in opposite directions from an insulated portion at the midpoint of said groove, said insulated portion being adjacent said resistor, electrical means connecting said resistor to said first and second conductors, relay means, further connection means for connecting said relay in controlling relation to said motor, actuator means, time delay mechanism, and still further connection means including said time delay mechanism for connection means including said time delay mechanism for connecting said actuator means to said relay means to provide for operating said actuator means at a predetermined precise matching of said driving and said driven devices.

11. In a precision matching apparatus, a driving means, driven means, relay means, a network circuit means connecting said driving means and said driven means to said network circuit to control the output of said network circuit, means connecting the output of said network circuit to said relay means, means including said relay means for controlling said driven means, indicating means, a time interval circuit, connection means including said time interval circuit for connecting said relay means in controlling relation to said indicating means, said time interval circuit comprising an electronic discharge device having an anode, a cathode and a control electrode, a parallel resistance-capacitance circuit, a source of voltage having two output terminals and a tap, a bias resistor, connection means connecting one of said terminals to said anode, means connecting said tap to said cathode through said bias resistor, additional connection means including said parallel circuit for connecting said second terminal to said control electrode, and means including said relay for effectively shunting said bias resistor to start said time interval circuit operating.

12. In a precision matching apparatus, a driving means, driven means, said driven means including motor means capable of varying the position of said driven means, a balanceable network circuit including a potentiometer having a resistor and a wiper, said circuit being balanced when said wiper has a predetermined relation with said resistor, first connection means connecting said driving means in controlling relation to said wiper, second connection means connecting said driven means in controlling relation to said resistor so that the position of said wiper with respect to said resistor is indicative of the relation of said driving means to said driven means, relay means, connection means including said relay means for connecting said balanceable network circuit to said motor means, indicating means, and means including said relay means for energizing said indicating means at circuit balance when matching of said driving and said driven means occurs.

13. In a precision matching apparatus, a driving means, driven means, actuator means for said driven means, coupling means between said driving means and said driven means for controlling said actuator means, indicator means, said coupling means including means for providing a precise coupling when said driving and driven means are related in a predetermined manner but permitting said driving means to move relative to said driven means and means including said indicator means for indicating said precise coupling.

14. In a precision matching apparatus, driving means, driven means, coupling means for connecting said driving means to said driven means, said coupling means comprising a two part signal source having a signal output depending upon the position of said parts, means connecting a first of said parts to said driving means, means connecting a second of said parts to said driven means, motor means for driving said driven means, and means connecting said output to said motor means, said signal being in effective on said motor means whenever said parts are in a predetermined relation.

References Cited in the file of this patent

UNITED STATES PATENTS

| 1,970,442 | Wittkuhns | Aug. 14, 1934 |
| 2,171,347 | Schneider | Aug. 29, 1939 |
| 2,324,383 | Grimes | July 13, 1943 |
| 2,390,787 | Haight | Dec. 11, 1945 |
| 2,428,402 | Winterbottom | Oct. 7, 1947 |
| 2,463,318 | Schneider | Mar. 1, 1949 |
| 2,542,113 | Bowitz | Feb. 20, 1951 |

FOREIGN PATENTS

| 368,688 | Great Britain | Sept. 30, 1930 |
| 874,157 | France | July 30, 1942 |